United States Patent [19]

Higgins

[11] 3,956,512

[45] May 11, 1976

[54] COLLAGEN COMPOSITIONS AND THE METHOD OF PREPARING THE SAME

[75] Inventor: Thomas E. Higgins, Brookfield, Ill.

[73] Assignee: Union Carbide Corporation, New York, N.Y.

[22] Filed: Apr. 28, 1975

[21] Appl. No.: 572,322

[52] U.S. Cl. ............................ 426/140; 426/278; 426/646; 426/652
[51] Int. Cl.² ........................................ A22C 13/00
[58] Field of Search ............ 426/140, 278, 646, 652

[56] References Cited
UNITED STATES PATENTS

| | | | |
|---|---|---|---|
| 2,114,220 | 4/1938 | Freudenberg et al. | 426/278 |
| 3,533,809 | 10/1970 | Cohly et al. | 426/140 X |
| 3,567,467 | 3/1971 | Cohly et al. | 426/140 |
| 3,627,542 | 12/1971 | Cohly et al. | 426/140 |
| 3,782,977 | 1/1974 | Henderson et al. | 426/140 |

*Primary Examiner*—James R. Hoffman
*Attorney, Agent, or Firm*—Franklyn Schoenberg

[57] ABSTRACT

A homogeneous formable aqueous collagen composition having uniformly incorporated therein at least about 1% by weight based on the solids content thereof of an antiblock additive selected from the group consisting of fatty acid partial esters of a polyhydric alcohol, acetylated fatty acid partial esters of a polyhydric alcohol, and mixtures of the same, said collagen composition being formable into shaped collagen structures that exhibit improved antiblocking characteristics.

19 Claims, No Drawings

COLLAGEN COMPOSITIONS AND THE METHOD OF PREPARING THE SAME

The present invention relates to improved collagen compositions and more particularly it relates to edible collagen compositions especially useful as tubular food casings and to the method of making the same.

In the manufacture of tubular food casings from materials such as collagen, problems have been encountered due to the delicate, fragile and tacky nature of the materials. For example, in one well known method of preparing a continuous length of tubular collagenous material, extruded collagen tubing is generally inflated with air, partially dried to impart a degree of strength which will enable it to withstand further processing, then generally collapsed into a flattened, two-ply strand and conveyed through a series of liquid treatment baths. Flattening the tubing serves to prevent "roping" of the tubular material and/or entrapment of air while advancing through the liquid treatment baths.

Reinflating the flattened tubing advancing from the liquid treatment baths is necessary for subsequent treatment, such as drying and sizing. Moreover, in the manufacture of food casings, the dried tubing is, in general, subsequently shirred and compressed to obtain short lengths thereof commonly called shirred casing sticks. While the shirring operation may be carried out immediately following the drying and sizing operation, quite often the dried casing is stored on reels and then fed separately to shirring machines.

As is known to those skilled in the art, reinflation of the flattened tubing into a tubular configuration is typically accomplished by injecting a stream of air under pressure into the collapsed tubing. When reinflating a delicate and fragile tubular material such as that made from collagen, the use of excessive air pressures can burst or seriously weaken the tubing wall, or can adversely affect the elongation or stretch characteristics thereof. Accordingly, relatively low internal pressure is preferably used to inflate and retain tubular collagen in a tubular configuration. However, because of the tendency of tubular collagen to block, the inner wall surfaces of the flattened tubing adhere to each other making reinflation of the tubing without damage thereto quite difficult. Methods and apparatus have been suggested for overcoming the problem, as, for example, disclosed in U.S. Pat. No. 3,619,442 to Henderson, but elimination of the blocking tendencies of collagen tubing would clearly be a desirable improvement.

It has been suggested in the past, as, for example, disclosed in U.S. Pat. Nos. 2,114,220 to Freudenberg et al, 3,446,633 to Talty, 3,551,535 to Henderson et al and 3,627,542 to Cohly et al, that a number of different materials may be incorporated in collagen compositions during their preparation or used to treat shaped collagen structures during the processing thereof to improve or modify the properties of shaped collagen products. However, to the best of our knowledge, there can be found no disclosure that is directed to improving or eliminating problems arising from the blocking characteristics of collagen materials, either during the forming of shaped collagen structures or in the shaped structures themselves.

In accordance with the present invention there is provided a method for preparing improved collagen compositions which comprises uniformly incorporating an anti-block additive selected from the group consisting of fatty acid partial esters of a polyhydric alcohol containing at least one free hydroxyl group, acetylated fatty acid partial esters of a polyhydric alcohol containing at least one free hydroxyl group, and mixtures of the same, into a formable collagen composition in an amount of at least about 1% by weight of the solids content of said collagen composition. It has been discovered that the use of such improved collagen compositions surprisingly and unexpectedly results in shaped collagen structures such as, for example, a tubular collagen food casing, having improved anti-blocking characteristics.

There is also provided in accordance with the invention a formable homogeneous collagen composition comprising at least about 1% by weight of the total solids thereof of an antiblock additive uniformly dispersed therein, said antiblock additive being selected from the group consisting of fatty acid partial esters of a polyhydric alcohol containing at least one free hydroxyl group, acetylated fatty acid partial esters of a polyhydric alcohol containing at least one free hydroxyl group, and mixtures of the same. Preferably, collagen compositions of the invention comprise at least about 6% by weight of collagen solids and contain noncollagenous fibers in an amount from about 5% to about 30% by weight of the dry solids content of said composition.

Reference to the terms "total solids," "solids content," and "dry solids content" as used throughout this specification and in the appended claims with respect to the collagen compositions of the invention is intended to refer to and should be understood as referring to the weight of all ingredients in such compositions excluding water.

To obtain the collagen compositions of the present invention, the antiblock additive is added to, and preferably uniformly dispersed in, the collagen compositions prior to forming desired shaped structures therefrom such as, for example, tubular food casings. Preparing the antiblock additive in the form of an aqueous emulsion prior to adding the additive to the collagen composition has been found to be especially advantageous for obtaining uniform dispersions thereof in the collagen composition. In this manner, the antiblock additive is incorporated and uniformly dispersed in the wall of the shaped collagen structure and affords improved antiblocking characteristics thereto during the entire processing sequence thereof without interfering with or adversely affecting the processing sequence employed.

In addition to imparting antiblock properties to formed collagen structures, it has been found that edible tubular food casings prepared in accordance with the practice of the invention exhibit generally improved stuffing and cooking properties and particularly improved resistance to "frying splits," a problem that may arise during cooking of an encased food product.

The collagen compositions of the invention may be prepared by any of the methods known in the art using collagen tissues obtained from a variety of raw materials as, for example, limed and unlimed animal hide splits and tendon.

Antiblock additives that are suitable for use in accordance with the present invention are fatty acid partial esters of polyhydric alcohols containing at least one free hydroxyl group, acetylated fatty acid partial esters of polyhydric alcohols, and mixtures of the same.

The term "fatty acid" as used herein is definitive of a group of aliphatic carboxylic acids that have widespread occurrence in natural fats, oils and allied substances. Such acids generally contain from 8 to 22 carbon atoms and may be saturated or unsaturated. The polyhydric alcohols used in forming the esters are alcohols containing at least 3 carbon atoms such as diethylene glycol, propylene glycol, glycerol, sorbitol, mannitol and the like.

Fatty acid partial esters that may be used as antiblock additives are those fatty mono- and diglycerides, and preferably fatty monoglycerides, prepared with fatty acids preferably containing from 12–18 carbon atoms that are esterified with a polyhydric alochol containing at least one free hydroxyl group. Exemplary preferred fatty monoglycerides are glycerol monostearate, glycerol monooleate, glycerol monopalmitate, glycerol monolaurate, etc. which are sold under the trademark MYVEROL.

Acetylated fatty acid partial esters that may be employed in accordance with the invention are the mono- and diacetate derivatives of fatty acid partial esters such as glycerol monostearate diacetate, glycerol monostearate monoacetate, glycerol monooleate diacetate and the like. Exemplary preferred acetylated fatty acid monoglycerides are sold under the trademark MYVACET.

In a preferred embodiment of the invention, collagen-containing tissue as, for example, limed animal hide splits, cleaned and prepared by methods well known in the art, are diced or coarsely chopped into pieces about ½ inch to 2 inches in size to facilitate transfer and agitation and then are subjected to treatment with a collagen swelling agent. Any of the known collagen swelling agents may be employed, but it is preferred to use dilute lactic, acetic or hydrochloric acid solutions. Collagen pieces are treated with swelling agent for an extended period of time, such as, for example, 4 to 9 hours or even longer, and, generally, until the character of the collagen material has completely changed from opaque to translucent. The swollen collagenous material is then washed with water to reduce the amount of residual acid and, generally, until the pH of the comminuted swollen collagen ranges between about 2.5–3.5. The swollen collagen is then drained, leaving pieces generally referred to as "acid-swollen chips".

As disclosed in U.S. Pat. No. 3,782,977 to Henderson et al, non-collagenous fibers that are to be incorporated into the collagen composition are first formed into a viscous aqueous fibrous dispersion that may contain between about 2% and 10% by weight of the non-collagenous fibers and between about 0.1% and 10% by weight of a viscosity control agent that is preferably water soluble or water dispersible. Suitable viscosity control agents include, for example, methyl cellulose, gelatin, starch, and, particularly, a dispersion of swollen collagen particles. Non-collagenous fibers that may be employed are any of the non-shrinking and essentially inert fibrous additives known to be suitable in collagen compositions such as, for example, wood, cotton, rayon, other cellulosic fibers, non-cellulosic fibers such as polyester, polyamide and the like.

Antiblock additives, as herein described, that are suitable for use in the present invention, may be homogeneously incorporated into the aqueous fibrous dispersion. While the antiblock additive may be added directly to the fibrous dispersion, it is preferably added in the form of an aqueous dispersion or emulsion thereof.

Acid-swollen chips to be used in the preparation of the formable collagen composition are, preferably, further comminuted prior to mixing with the aqueous fibrous dispersion. The acid-swollen chips may be partially subdivided by means known in the art, such as by coarse grinding or crushing, to prepare a mass containing a predominance of chunks having major dimensions of about ⅛ inch to ½ inch.

The viscous fibrous dispersion, wherein is incorporated the antiblock additive, is vigorously admixed with the acid-swollen collagen chips in a suitable dough mixer or other similar mixing equipment, whereby the fibrous and antiblock additive components are uniformly distributed throughout the collagen mass in a relatively short time, as, for example, between about 2 and 10 minutes. Towards the end of the mixing step, the collagen mass becomes much more viscous which helps in preventing separation of the various components during forming and subsequent processing thereof.

The collagen composition that is prepared preferably comprises at least about 6% by weight of collagen solids, and has uniformly incorporated therein between about 5% and 30% by weight of non-collageneous fibers based on the weight of total solids. Also uniformly incorporated therein is the antiblock additive of the invention in an amount of at least about 1% by weight, and preferably at least about 5% up to about 20% by weight, of the solids content in the collagen composition. In accordance with the present invention, the quantity of antiblock additive needed to impart the desired improved antiblocking characteristics is important, and at least 1% by weight of antiblock additive to total solids of the collagen composition should be used. However, the amount of the antiblock additive used may be varied over a relatively wide range, and the upper limit thereof that may be used is not critical and may be substantially in excess of that actually required. In general, however, amounts of antiblock additive greater than about 30% by weight of total solids in the collagen composition may detrimentally affect some physical properties of the collagen structures prepared therefrom and should, therefore, be avoided.

It is important that during grinding and mixing of the "acid swollen chips," the temperature of the collagen mass by kept low and the temperature of the mass is, in general, maintained below about 25°C.

In alternative embodiments of the invention, the antiblock additive, preferably in the form of an aqueous dispersion or emulsion thereof, may be added directly to the ground acid swollen chips, either before or during mixing with the fibrous dispersion mixture, or may be added to a swollen collagen slurry prepared in accordance with any of the methods known in the art.

The uniform high collagen solids composition so prepared is suitable, with only limited further processing, for forming into commercially acceptable formed or extruded collagen structures. A screw extruder or similar device can be used to transfer the collagen composition to homogenization equipment used in final preparation of the composition for extrusion.

The collagen composition is extruded to form a continuous tube of collagen, which tube is strong enough to support itself in a tubular configuration with a low pressure inflation air while being conveyed to and through a predryer. The tubing is then collapsed between nip rolls, neutralized by passing through a dip tank containing very dilute ammonium hydroxide, washed by passing through water tanks, and then plasticized by being conveyed through a dilute glycerine solution. The tubing is then readily reinflated with low pressure air, conveyed through a dryer while maintaining the tubular configuration, and then shirred into a shirred casing stick by passing through a shirring apparatus.

Collagen tubing prepared in accordance with the invention performs satisfactorily through each of the various processing steps with no problems in reinflating the tubing being encountered due to "blocking" of the tubular collagen material. Moreover, it has been found that tubular collagen casing prepared in accordance with the practice of the invention, in addition to exhibiting substantially no blocking problems, performs satisfactorily during stuffing operations and exhibits improved resistance to "frying splits" during cooking.

Tubular collagen food casings of the present invention having the antiblock additive herein described uniformly incorporated therein, in an amount from about 0.6% to about 19% by weight, and preferably between about 3% and 13% by weight, of all components of said casing, exhibit substantially improved antiblocking characteristics and, in general, exhibited improved performance during stuffing operations and cooking. Especially preferred are tubular collagen food casings having uniformly incorporated therein from about 3% to about 19% by weight of non-collageneous fibers based on the weight of all components of said casings.

The following examples are set forth as illustrating embodiments of the present invention and are not intended in any way to indicate the limits of the invention. Parts and percentages, unless otherwise indicated, are by weight.

EXAMPLE I 1,100 Pounds of limed beef hide splits were chopped into approximately ½ inch to 2 inch pieces and subjected to an additional lime treatment by charging into a tank together with 80 lbs. of lime and sufficient water to give a water to hide ratio of 6 to 1. The lime treatment was continued for 92 hours with intermittent agitation after which the limed hide chips were leached with approximately 14 gals./min. of water for 23 hours. The hide chips were then swollen for 9 hours in a hydrochloric acid solution maintained at a pH of 1 using a flow rate of dilute acid of 10 gals./min. At the end of the acid swell treatment, the swollen chips were washed with water at 30 gals./min. for about 1.2 hours until a wash water pH of 2.6 was reached. The chips were allowed to equilibrate for about 16 hours in the weak acid solution, then drained and chilled to about 1°C.

A cellulose fiber dispersion was prepared using the following proportion of ingredients:

| | |
|---|---|
| Extruded collagen dispersion | 265 lbs. |
| Wood cellulose fibers | 145 lbs. |
| Water | 2092 lbs. |

The wood cellulose fibers used had an average fiber length of about 0.040''. Sheets of fibers were separated into convenient pieces, soaked in a portion of the water for about 60 minutes and then mixed for about two minutes, soaked for an additional 30 minutes, and then mixed for about 2 minutes. The rest of the ingredients were added to the mixer and the mixture was blended for about 100 minutes. The resulting wood cellulose fiber suspension was smooth, highly viscous, free of fiber clumps and had a composition of collagen solids 1%, wood cellulose fibers 5.6% and water 93.4%.

A series of collagen compositions of 30 to 100 lbs. having a total solids of 11.3% were prepared using the following proportions of ingredients:

| | |
|---|---|
| "Acid-swollen chips" | variable |
| Wood-cellulose dispersion | 1.7% |
| Antiblock additive | variable |
| Water | 88.7 |

"Acid-swollen chips" prepared as described hereinabove were ground in a meat grinder into pieces substantially between about ⅛ inch to ½ inch in size prior to blending with the viscous cellulose fiber dispersion. The temperature during grinding of the chips was controlled so as not to exceed about 20°C.

Blending of the "acid-swollen chips," cellulose fiber dispersion and antiblock additive was conducted as described below.

The ingredients were mixed in two steps. In the first step the antiblock additive, the water in liquid or frozen form, and a portion of the ground, "acid-swollen chips" were added to the cellulose fiber dispersion and then thoroughly mixed. In the second mixing step, the mixture was blended with the remainder of the ground "acid-swollen chips" and mixed for about five minutes at which time the composition was homogeneous and began to adhere to the mixing equipment. The temperature of the various materials during the two mixing steps was controlled so as not to exceed 20°C.

The proportions of ingredients in the various collagen compositions of the Example are summarized in Table I, below:

TABLE 1

| | % OF COMPOSITION SOLIDS | | | | | | | | |
|---|---|---|---|---|---|---|---|---|---|
| | A | B | C | D | E | F | G | H | I |
| Collagen Composition | 85 | 84 | 75 | 84.9 | 84 | 80 | 55 | 84 | 80 |
| Cellulose Fibers | 15 | 15 | 15 | 15 | 15 | 15 | 15 | 15 | 15 |
| Antiblock Additive | | | | | | | | | |
| MYVACET 7-00 | — | 1.0 | 10.0 | — | — | — | — | — | — |
| MYVACET 9-40 | — | — | — | 0.1 | 1.0 | 5.0 | 30 | — | — |
| MYVATEX 25-07 | — | — | — | — | — | — | — | 1 | 5 |

MYVACET 7-00 is the trademark of Eastman Chemical Products, Inc. for a distilled acetylated monoglyceride derived from hydrogenated lard.

MYVACET 9-40 is the trademark of Eastman Chemical Products, Inc. for a distilled acetylated monoglyceride derived from prime steam lard.

MYVATEX 25-07 is the trademark of Eastman Chemical Products, Inc. for a distilled monoglyceride derived from hydrogenated vegetable oil.

MYVATEX 25-07 is sold as an oil in water emulsion of 25% solids and was added to the collagen-fiber dispersion mixture as purchased. MYVACET 7-00 was prepared as an oil in water emulsion with polysorbate 60 as emulsifying agent before adding to the collagen-fiber dispersion mixture. MYVACET 9-40 was added to the cellulose-fiber dispersion mixture without prior emulsification.

After preparing each of the various collagen compositions, the composition was fed through a rotary-shear homogenizer by means of a screw extruder and pump. To prevent degradation of the collagen, the homogenizer rotor and stator were cooled with a coolant maintained at a temperature about −5°C.

After homogenization, the blend was pumped through two parallel filters with 0.003 inch slots to break up any remaining collagen lumps and remove any non-dispersed matter.

The filtered collagen blends were pumped and metered through an extrusion nozzle to form a continuous tube of collagen. The extruded tubes were inflated with low-pressure inflation air while being conveyed on horizontal rolls.

The inflated collagen tubing was partially dried and hardened by passing through a predryer at 50°C., then collapsed between nip rolls, neutralized by passing through a dip tank containing 0.06 N ammonium hydroxide, washed by being conveyed through water tanks and then plasticized by being conveyed through a dilute glycerine solution.

The tubing samples were then reinflated with low pressure air, dried in air at 100°C., moisturized in an equalizer at 70% RH and then shirred by passing through a shirring apparatus.

The tubing samples were reinflated in a suction box as described in U.S. Pat. No. 3,619,442. The suction box is a relatively airtight chamber through which the tubular collagen gel stock passes just before entering the dryer. In the suction box a small negative pressure is maintained, decreasing the pressure outside the tubing. Air under pressure, introduced at the shirring machine into the continuous length of tubing, acts, with the negative pressure in the suction box, to inflate the tubing in the suction box. The air pressure required to reinflate the flattened tubing is determined as the sum of the suction box negative pressure and the shirring machine inflation pressure. The minimum reinflation pressure is the minimum pressure required to maintain the collagen tubing in an inflated condition while it advances through the dryer and then through the shirring apparatus of the shirring machine. The minimum reinflation pressure was determined under operating conditions by adjusting the suction box negative pressure to the point where the collagen tubing just remained in an inflated state. The sum of the shirring machine inflation pressure and the suction box negative pressure under these conditions was the minimum reinflation pressure.

A summary of the results determined in reinflating the various samples of the Example is reported in Table 2, below.

TABLE 2

| Collagen | Antiblock Additive | Reinflation Pressure | |
|---|---|---|---|
| | | Pressure (inches of water) | Decrease From Control |
| A(Control) | — | 2.4 | — |
| B | 1 | 1.9 | 0.5 |
| C | 10 | <1.1 | >1.3 |
| D | 0.1 | 2.4 | 0 |
| E | 1 | 2.2 | 0.2 |
| F | 5 | 2.0 | 0.4 |
| G | 30 | 1.7 | 0.7 |
| H | 1 | 1.3 | 1.1 |
| I | 5 | <0.6 | >1.8 |

As shown in Table 2, each of the antiblock additives, when employed in the porportions of the present invention, reduced the minimum reinflation pressure as compared to collagen compositions containing no antiblock additive.

EXAMPLE II

Using the procedure of Example I, ground collagen "acid-swollen chips" were prepared from 1457 pounds of limed beef hide splits that were subjected to an additional lime treatment with 102 pounds of lime. The procedure of Example I was also used in preparing a cellulose fiber dispersion with the following proportion of ingredients:

| Ground Acid-Swollen Collagen Chips | 275 lbs. |
| Wood Cellulose Fibers | 176 lbs. |
| Water | 2507 lbs. |

Using the procedure described in Example I, a series of collagen compositions of about 37 pounds each was prepared having the following proportion of ingredients with each of the compositions having a total solids of 11.3%:

| Ground acid-swollen chips | variable |
| Wood-cellulose dispersion | 1.7% |
| Antiblock additive | variable |
| Water | 88.7% |

The ingredients in each of the collagen compositions of the Example are summarized in Table 3, below:

TABLE 3

| Collagen Sample | Collagen (% of solids) | Cellulose Fibers (% of solids) | Antiblock Additive | |
|---|---|---|---|---|
| | | | Type | % of solids |
| A (Control) | 85 | 15 | None | — |
| B | 75 | 15 | MYVACET 9-40 | 10 |
| C | 65 | 15 | MYVACET 9-40 | 20 |
| D | 75 | 15 | ATMUL 80 | 10 |
| E | 70 | 15 | Lard | 15 |
| F | 60 | 15 | Lard | 25 |

MYVACET 9-40 is the trademark of Eastman Chemical Products, Inc. for a distilled acetylated monoglyceride derived from prime steam lard.

ATMUL 80 is the trademark of ICI America, Inc. for a fatty acid partial ester that is a mixture of mono- and diglyceride with 40% min. of the monoglycerides having a melting point of about 46°C.

MYVACET 9-40 was added directly to the collagen-cellulose fiber dispersion without prior emulsification and ATMUL 80 and lard were added after melting and supercooling.

Collagen tubing samples were prepared from each of the collagen compositions of the Example with the procedure described in Example I being used to measure the reinflation pressure for each of the collagen tubing samples. The results determined for reinflating the various samples of the Example are reported in Table 4, below.

TABLE 4

| Collagen Composition | Antiblock Additive | | Minimum Reinflation Pressure (inches of water) | |
|---|---|---|---|---|
| | Type | % of solids | As Measured | Decrease from Control |
| A (Control) | None | — | 3.6 | — |
| B | MYVACET 9-40 | 10 | 2.6 | 1.0 |
| C | MYVACET 9-40 | 20 | 2.3 | 1.4 |
| D | ATMUL 80 | 10 | 1.7 | 1.9 |
| E | Lard | 15 | 2.9 | 0.7 |
| F | Lard | 25 | 2.2 | 1.4 |

What is claimed is:

1. A method of preparing a formable collagen composition suitable for use in preparing a shaped collagen structure which exhibits improved antiblocking characteristics including the step of uniformly incorporating into a formable collagen composition an antiblock additive selected from the group consisting of fatty acid partial esters of a polyhydric alcohol having at least one free hydroxyl group, acetylated fatty acid partial esters of a polyhydric alcohol having at least one free hydroxyl group, and mixtures of the same, in an amount of at least about 1% by weight of said additive based on the solids content of said collagen composition.

2. A method as claimed in claim 1 wherein said antiblock additive is incorporated in said collagen composition in an amount from about 5% to about 20% by weight of the solids content of said collagen composition.

3. A method as claimed in claim 1 wherein said formable collagen composition comprises at least about 6% by weight of collagen solids.

4. A method as claimed in claim 1 wherein said antiblock additive is a fatty acid partial ester of a polyhydric alcohol having at least one free hydroxyl group.

5. A method as claimed in claim 1 wherein said antiblock additive is an acetylated fatty acid partial ester of a polyhydric alcohol having at least one free hydroxyl group.

6. A method of preparing a formable collagen composition suitable for use in preparing a shaped collagen structure which exhibits improved antiblocking characteristics including the steps of:
   a. preparing a viscous aqueous dispersion of non-collagenous fibers and an antiblock additive selected from the group consisting of fatty acid partial esters of a polyhydric alcohol having at least one free hydroxyl group, acetylated fatty acid partial esters of a polyhydric alcohol having at least one free hydroxyl group, and mixtures of the same;
   b. preparing a comminuted pre-swollen collagen mass; and then
   c. admixing an amount of said aqueous fiber-antiblock additive dispersion with said pre-swollen collagen mass so that at least about 1% by weight of said antiblock additive based on the solids content of said collagen admixture is incorporated in the collagen composition and then thoroughly mixing until a uniform admixture is obtained.

7. A method as claimed in claim 6 wherein said antiblock additive is incorporated in said collagen composition in an amount from about 5% to about 20% by weight of the solids content of said collagen composition.

8. A method as claimed in claim 6 wherein said antiblock additive is a fatty acid partial ester of a polyhydric alcohol having at least one free hydroxyl group.

9. A method as claimed in claim 6 wherein said antiblock additive is an acetylated fatty acid partial ester of a polyhydric alcohol having at least one free hydroxyl group.

10. A method as claimed in claim 6 wherein said collagen composition contains at least about 6% by weight of collagen solids.

11. A homogeneous formable aqueous collagen composition having uniformly incorporated therein at least about 1% by weight based on the solids content thereof of an antiblock additive, said antiblock additive being selected from the group consisting of fatty acid partial esters of a polyhydric alcohol having at least one free hydroxyl group, acetylated fatty acid partial esters of a polyhydric alcohol having at least one free hydroxyl group, and mixtures of the same.

12. The collagen composition of claim 11 wherein said collagen composition contains from about 5% to about 20% by weight of the dry solids content thereof of said antiblock additive.

13. The collagen composition of claim 11 wherein said collagen composition comprises at least about 6% by weight of collagen solids.

14. The collagen composition of claim 13 wherein said collagen composition contains from about 5% to about 30% by weight of the dry solids content thereof of noncollagenous fibers.

15. A collagenous tubular food casing having uniformly incorporated therein from about 0.6% to about 19% by weight of all components of said casing of an antiblock additive selected from the group consisting of fatty acid partial esters of a polyhydric alcohol having at least one free hydroxyl group, acetylated fatty acid partial esters of a polyhydric alcohol having at least one free hydroxyl group, and mixtures of the same.

16. The tubular casing of claim 15 having uniformly incorporated therein from about 3% to about 19% by weight of all components of said casing of non-collagenous fibers.

17. The tubular casing of claim 15 having uniformly incorporated therein from about 3% to about 13% by weight of said antiblock additive.

18. The tubular casing of claim 15 wherein said antiblock additive is a fatty acid partial ester of a polyhydric alcohol having at least one free hydroxyl group.

19. The tubular casing of claim 15 wherein said anti-block additive is an acetylated fatty acid partial ester of a polyhydric alcohol having at least one free hydroxyl group.

* * * * *

UNITED STATES PATENT OFFICE
CERTIFICATE OF CORRECTION

Patent No. 3,956,512            Dated May 11, 1976

Inventor(s) Thomas E. Higgins

It is certified that error appears in the above-identified patent and that said Letters Patent are hereby corrected as shown below:

Column 4, line 48, "mass by" should read -- mass be --.

Column 8, lines 9 to 10, Table 2, the heading of column 1 in Table 2 should read -- Collagen Composition --.

Column 8, lines 8 to 10, Table 2, the heading of column 2 in Table 2 should read -- Antiblock Additive (% of Solids) --.

Signed and Sealed this twelfth Day of July 1977

[SEAL]

Attest:

RUTH C. MASON
*Attesting Officer*

C. MARSHALL DANN
*Commissioner of Patents and Trademarks*